United States Patent [19]

Hayashi et al.

[11] Patent Number: 5,915,666
[45] Date of Patent: Jun. 29, 1999

[54] SOLENOID VALVE WITH SWITCH

[75] Inventors: Bunya Hayashi; Makoto Ishikawa, both of Yawara-mura, Japan

[73] Assignee: SMC Corporation, Tokyo, Japan

[21] Appl. No.: 08/840,853

[22] Filed: Apr. 17, 1997

[30] Foreign Application Priority Data

May 23, 1996 [JP] Japan ..................................... 8-151738
May 28, 1996 [JP] Japan ..................................... 8-156042

[51] Int. Cl.$^6$ ................................................... F16K 31/02
[52] U.S. Cl. ...................................... 251/129.01; 137/884
[58] Field of Search .................................... 137/269, 271, 137/554, 884; 251/129.04, 129.01

[56] References Cited

U.S. PATENT DOCUMENTS

| | | |
|---|---|---|
| 2,118,852 | 5/1938 | McDonnell . |
| 3,656,510 | 4/1972 | Kinner ................................ 137/884 X |
| 5,000,226 | 3/1991 | Stoll et al. ............................... 137/884 |
| 5,669,413 | 9/1997 | Hegglin et al. .......................... 137/554 |
| 5,699,830 | 12/1997 | Hayashi et al. ...................... 137/884 X |
| 5,699,834 | 12/1997 | Hayashi et al. ...................... 137/271 X |

FOREIGN PATENT DOCUMENTS

| | | |
|---|---|---|
| 0 715 108 | 6/1996 | European Pat. Off. . |
| 74 34 476 | 3/1975 | Germany . |
| 75 23 892 | 4/1976 | Germany . |
| WO 90/12234 | 10/1990 | WIPO . |

*Primary Examiner*—Kevin Lee
*Attorney, Agent, or Firm*—Oblon, Spivak, McClelland, Maier & Neustadt, P.C.

[57] ABSTRACT

An electric switch 33 comprising an operation member 34, a first and a second pins 28*a* and 28*b* provided so as to activate and deactivate a feeding circuit, and a conducting plate 38 displaced by the operation of the operation member to electrically connect and disconnect the first pin to and from the second pin is disposed on the outer surface of an electromagnetic operation section 11 of a solenoid valve 1A. Thus, the solenoid valve 1A can be simply and reliably disconnected from the power supply at the solenoid valve installation site.

16 Claims, 8 Drawing Sheets

SOLENOID VALVE WITH SWITCH

FIELD OF THE INVENTION

The present invention relates to a solenoid valve with an electric switch that can turn the electric supply to a solenoid on and off.

PRIOR ART

Solenoid valves generally comprise a main valve section that has a built-in valve member that diverts the flow of a pressurized fluid and an electromagnetic operation section that activates a solenoid to switch the valve member.

Such solenoid valves are normally installed near fluid pressure equipment, and in such a case, a plurality of solenoid valves or a plurality of solenoid valves assembled on a manifold base are often loaded on a single rail to form a set of connected solenoid valves so that a single controller can control all the solenoid valves.

If a new set of connected solenoid valves is installed and connected to the fluid pressure equipment, or the number of solenoid valves in the existing set is increased, or a defective solenoid valve is replaced, it will be necessary to strictly check whether the newly installed solenoid valve can appropriately switch the fluid pressure equipment. In this case, to ensure safety and operational efficiency, only the solenoid valve to be serviced should be disconnected from the power supply to prevent electricity from being supplied thereto in order to check its operational conditions through manual operations.

Specific solenoid valves can be disconnected from the power supply by adjusting the controller, but since the controller is installed away from the solenoid valves, it is cumbersome to go to the controller for disconnection each time maintenance is required.

In Japanese Patent Application No. 6-329712, the inventors proposed a solenoid valve controller that includes a switch unit that is disposed adjacent to a set of connected solenoid valves and that has switches corresponding to the individual solenoid valves so that the switch can switch each solenoid valve when it is connected to the output terminal of the controller or to a power supply terminal, or when the electric supply is turned off.

This solenoid valve controller offers the advantage that the switch can turn each solenoid valve on and off at the site to allow the operational conditions of the solenoid valves to be individually checked.

Since, however, this solenoid valve controller has various switches, each one corresponding to a particular solenoid valve, integrated into a single switch unit, the correspondence between the solenoid valves and the switches cannot be easily understood.

In addition, to increase the number of solenoid valves, the number of switches must be increased and these additional switches must be connected to the corresponding solenoid valves.

DISCLOSURE OF THE INVENTION

It is a main object of this invention to provide a solenoid valve that can be simply and reliably disconnected from a power supply, and that can be handled and operated easily.

It is another object of this invention to provide a safe solenoid valve capable of preventing operational errors while ensuring easy switching operations, thereby allowing solenoid valves to be serviced simply and reliably disconnected from the power supply even if various solenoid valves are connected together to form a set of connected solenoid valves so that all the solenoid valves can be controlled at the same time.

It is yet another object of this invention to provide a solenoid valve with a switch that has a superior structure and functions, which includes an electric switch with a simple structure which can be mounted easily and which cannot be inadvertently turned on or off.

A solenoid valve with the above configuration enables the electric switch directly mounted thereon to be operated to turn the valve on and off.

This eliminates the need to go to a controller for disconnection, and allows the solenoid valve to be disconnected at the solenoid valve installation site, thereby enabling simple and efficient maintenance such as operation checks using a manual operation means.

In addition, if various solenoid valves are connected together as a set of connected solenoid valves, the electric switches attached to the solenoid valves to be serviced can be operated so as to reliably disconnect only those solenoid valves from the power supply, thereby preventing the switches for the other solenoid valves from being operated.

According to this invention, the electric switch is installed in a position that allows external operations, and is guarded by a guide wall with at least the same height as the electric switch.

This prevents the switch from being inadvertently switched due to contact with a human body or other foreign object. Thus, this solenoid valve is very safe.

According to a specific embodiment of this invention, the electric switch comprises an operation member installed on the outer surface of the solenoid valve; a first pin leadingto an external power supply and a second pin leading to the solenoid; and an approximately U-shaped conducting member disposed between the first and the second pins, where in the operation member is used to displace the conducting material and connect or disconnect the first pin to or from the second pin.

The electric switch with this configuration has a simple structure, can be mounted in a limited space, and turned on and off easily and reliably. It is therefore suitable for incorporation in solenoid valves of limited shapes and sizes.

According to another embodiment of this invention, the electromagnetic operation section has a printed substrate with a feeding circuit assembled thereon and a cover that covers the printed circuit, the first and the second pins are disposed so as to penetrate the cover and protrude outwardly, and the cover includes an operation member which includes a conducting member, disposed on its outer surface.

According to a preferred embodiment of this invention, the cover includes the guard wall that guards the operation member, and a guide groove is formed in each of the inner surfaces of the right and left guide walls, while a protruding branch is formed on each of the right and left outer surfaces of the operation member so that the guide grooves and the protruding branches form a guide mechanism to guide the movement of the operation member.

The solenoid valve according to this invention has a manual operation means that enables the valve member to be manually switched.

DETAILED DESCRIPTION OF THE INVENTION

Figure 1:
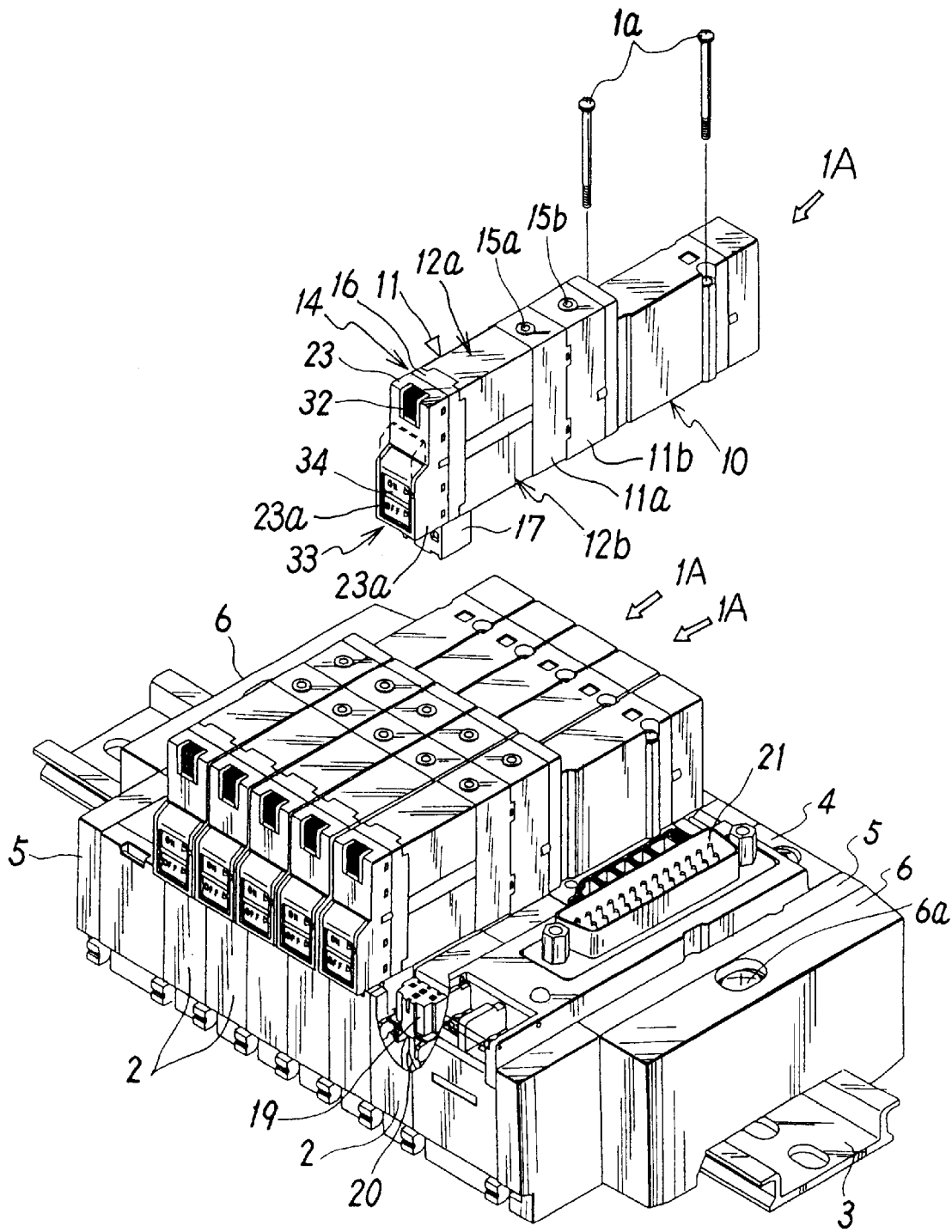
FIG. 1 is a perspective view showing a set of connected solenoidvalves comprising solenoid valves with switches according to the first embodiment of this invention, with one valve disconnected from the set.

FIGS. 1 to 8 show the first embodiment of a solenoid valve with switches according to this invention, and FIG. 1 shows a set of connected solenoid valves comprising a plurality of solenoid valves 1A.

The solenoid valve 1A is mounted on a manifold base 2 using mounting bolts 1a, 1a, and manifold bases 2 are installed on a rail 3 to connect the desired number of solenoid valves together.

A feeding box 4 for feeding electricity to all the solenoid valves 1A at a time, a port block 7, and an end plate 5, 5 are disposed on either side of the connected manifold bases 2, and these members are fixed to the rail 3 by mounting members 6, 6 disposed on both sides ofthe members and fixed to the rail 3 by a mounting screw 6a.

The solenoid valve 1A is of a double-solenoid pilot 5 port type that includes two electromagnetically operated pilot valves 12a, 12b, and the manifold base 2 has a structure suitable for the mounting of solenoid valves 1A thereon.

Specifically, the manifold base 2 includes a compressed air supply channel and two discharge channels (not shown) which penetrate the manifold bases 2 in the connecting direction (the horizontal width direction), and which communicate with one another in an airtight manner. The channels individually communicate with a supply opening and two discharge openings on the solenoid valve installation surface that is the top surface of the manifold bases 2 and with various ports formed in the port block 7.

The solenoid valve 1A comprises a main valve section 10 that uses a built-in valve member to divert the flow of compressed air and an electromagnetic operation section 11 for switching the valve member in the main valve section 10. The electromagnetic operation section 11 includes the two pilot valves 12a, 12b vertically disposed therein and a feeding section 14 for feeding electricity to the solenoid valves 13a, 13b (see FIG. 2) in the pilot valves 12a, 12b. The feeding section 14 has an electric switch 33 for disconnecting the solenoid valves 13a, 13b from the power supply.

In addition, the main valve section 10 includes one compressed air supply port, two output ports, and two discharge ports (not shown). When the solenoid valve 1A is mounted on the manifold base 2, the supply port communicates with the supply opening, and the two discharge ports communicate with the two discharge openings. The two output ports also individually communicate with the two output openings in the solenoid valve installation surface of the manifold base 2 and with openings on the rear surface of the manifold base 2 through channels formed on the manifold base 2.

The pilot valves 12a, 12b are configured as known three-port valves that are always closed. That is, the pilot valves 12a, 12b includes a pilot supply port in communication with the supply channel, a pilot output port for outputting a pilot fluid to the main valve section 10, and a pilot discharge port that communicates with one of the discharge channels. When the solenoids 13a, 13b are energized, the pilot supply port and the pilot output port communicate with each other, and when the solenoids 13a, 13b are de-energized, the pilot output port and the pilot discharge port communicate with each other.

Blocks 11a, 11b in the electromagnetic operation section 11 have a first manual operation means 15a and a second manual operation means 15b corresponding to the two pilot valves 12a, 12b, respectively. When the solenoids 13a, 13b in the pilot valves 12a, 12b corresponding to the manual operation means 15a, 15b are in a non-conductive state, the manual operation means 15a, 15b are pressed to reproduce a switched state that is the same as when the solenoids 13a, 13b are conductive, thereby switching the valve member of the main valve section 10.

Figure 2:
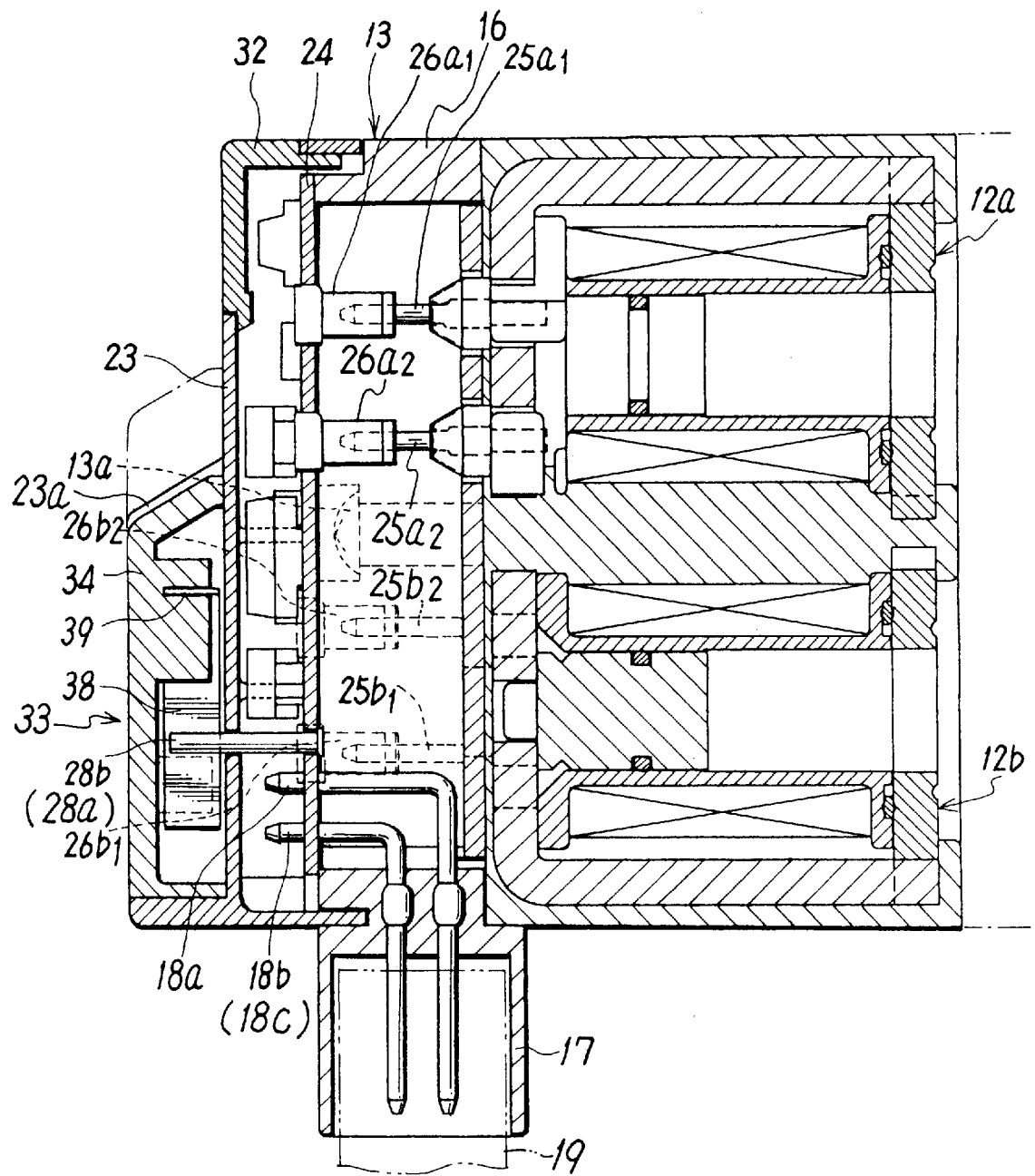
FIG. 2 is an enlarged cross sectional view showing the integral part of the solenoid valve in FIG. 1.
Figure 3:
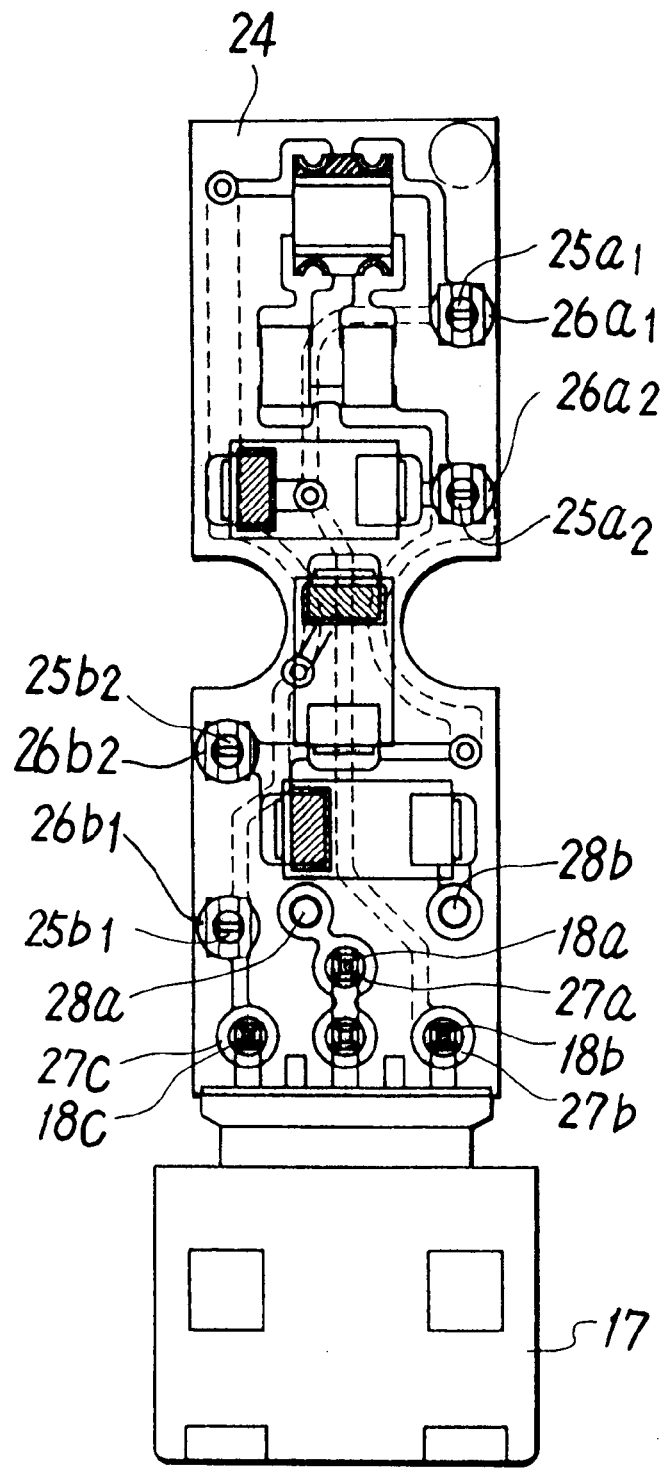
FIG. 3 is a front view of a printed substrate and a terminal box.
Figure 4:
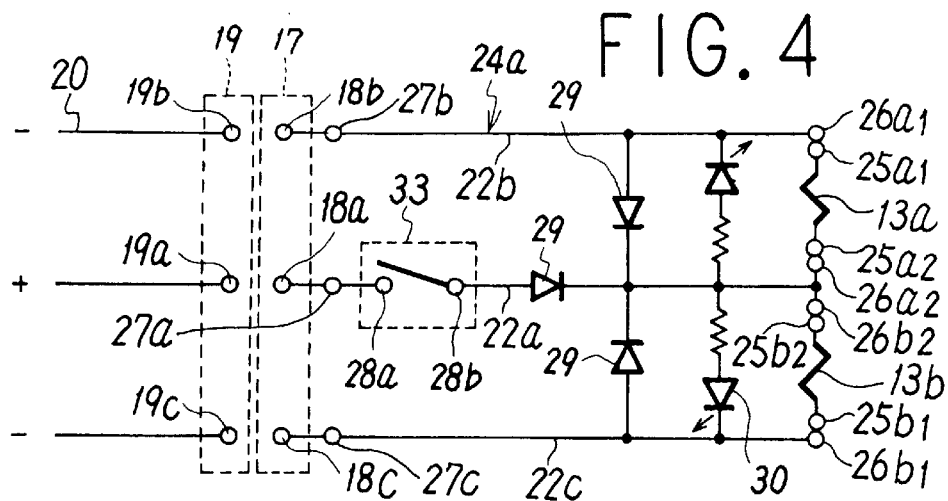
FIG. 4 shows a feeding circuit for solenoid valves.

As is apparent from FIGS. 2 and 3, the feeding section 14 has a frame-like body 16 mounted on the electromagnetic operation section 11 with a mounting screw 14a; and a terminal box 17 disposed under the body 16 (on the manifold base side). The terminal box 17 has three angled receiving terminals 18a, 18b, 18c. When the solenoid valve 1A is installed on the manifold base 2, the receiving terminals 18a, 18b, 18c are electrically connected to feeding terminals 19a, 19b, 19c in a terminal block 19 mounted on the manifold base 2, as is shown in FIGS. 1 and 4. In addition, the feeding terminals 19a, 19b, 19c are electrically connected via power supply line 20 to pins in a relay terminal 21 mounted on a feeding box 4.

The body 16 includes a printed circuit 24 with a feeding circuit 24a assembled thereon, and is shown in FIG. 4; and a detachable cover 23 that covers the printed circuit 24 and includes the electric switch 33 for operations from the axial end of the solenoid valve.

The feeding circuit 24a feeds electricity to the two solenoids 13a, 13b through a common lead 22a connecting to the positive pole of the power supply and leads 22b, 22c connecting to the negative pole, and has a diode 29 to prevent counter electromotive forces, and light-emitting diodes 30, 30 that indicate the conductive state of the solenoids 13a, 13b.

The printed substrate 24 includes four solenoid terminal holes 26a1, 26a2 and 26b1, 26b2, three receiving terminal holes 27a, 27b, 27c, and first and second pins 28a and 28b that penetrate the cover 23 and protrude outwardly, as shown in detail in FIGS. 2 and 3. Solenoid terminals 25a1, 25a2 and 25b1, 25b2, each pair protruding from the solenoid 13a or 13b, respectively, are inserted into the solenoid terminal holes 26a1, 26a2 and 26b1, 26b2 in a conductive state, and the receiving terminals 18a, 18b, 18c are inserted into the receiving terminal holes 27a, 27b, 27c in a conductive state.

In addition, the first pin 28a electrically connects to the common terminal 18a among the three receiving terminals and the second pin 28b electrically connects to the solenoid terminals 25a2 and 25b2 of the two solenoid valves 13a, 13b via the diode 29.

In addition, the electric switch 33 is composed of an operation member 34 disposed on the outer surface of the cover 23 in such a way that it can be vertically moved; the first and the second pins 28a and 28b horizontally disposed at an interval so as to constitute a pair of electric contacts; and a conducting plate 38 that serves to electrically connect the first and second pins 28a and 28b together in response to the operation of the operation member 34.

Figure 5:
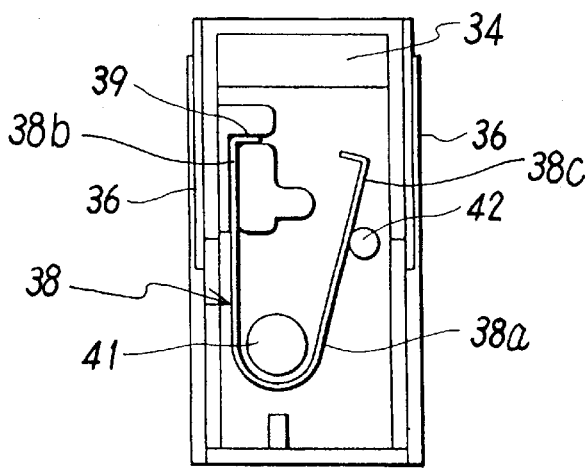
FIG. 5 is a rear view of an operation member for electric switches.
Figure 6:
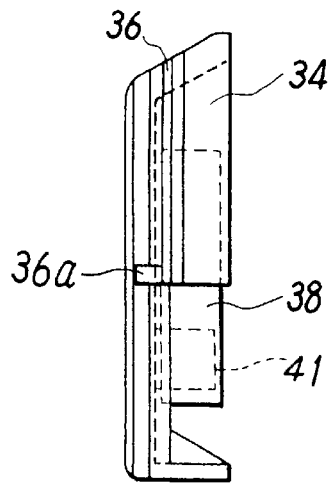
FIG. 6 is a side view of the operation member.
Figure 7:
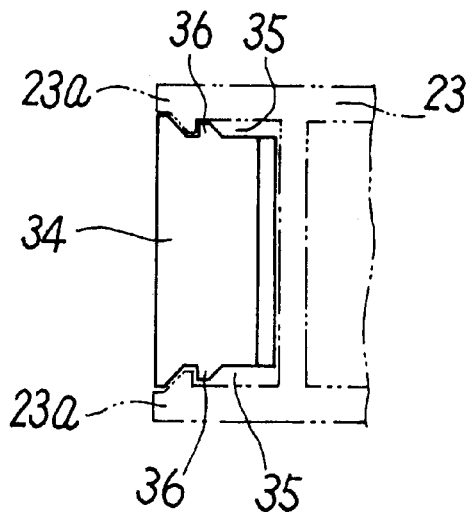
FIG. 7 is a plan view of the operation member.

As shown in FIGS. 5 to 7, the operation member 34 is shaped like a long vertical rectangle and is disposed between a lateral pair of guard walls 23a, 23a formed on the outer surface of the cover 23. A guide groove 35 is formed in the inner surface of the guard walls 23a, 23a, and a protruding branch 36 that fits into the guide groove 35 is formed in the upper half of each of the right and left outer walls of the operation member 34. A guide mechanism consisting of the guide groove 35 and the protruding branch 36 supports the operation member 34 in such a way that the member 34 can be vertically moved along the guard walls 23a, 23a.

The guard walls 23a, 23a are at least as high as the operation member 34, and serve to protect the operation member 34 on both sides to prevent the member 34 from being inadvertently moved due to contact with a human body or some other foreign object.

The conducting plate 38 is formed of a conductive material such as an elastic metallic plate and is shaped like a character "U" that is somewhat tapered. The conducting plate 38 is mounted on the rear surface of the operation member 34 by fitting in a bent portion 38a a first protruding branch 41 on the rear surface of the operation member 34, and fitting and engaging one of the sides 38b of the plate 38 in and with an engagingly locking groove 39 in the operation member 34, while contacting the other side 38c with the side of a second protruding branch 42 in such a way that the side 38c can be elastically deformed inwardly.

In the figure, 32 is a transparent or semi-transparent display window that is opposite the light-emitting diodes 30, 30 on the printed circuit 24 and that allows the light of the light-emitting diodes to be observed from the outside.

Figure 8:
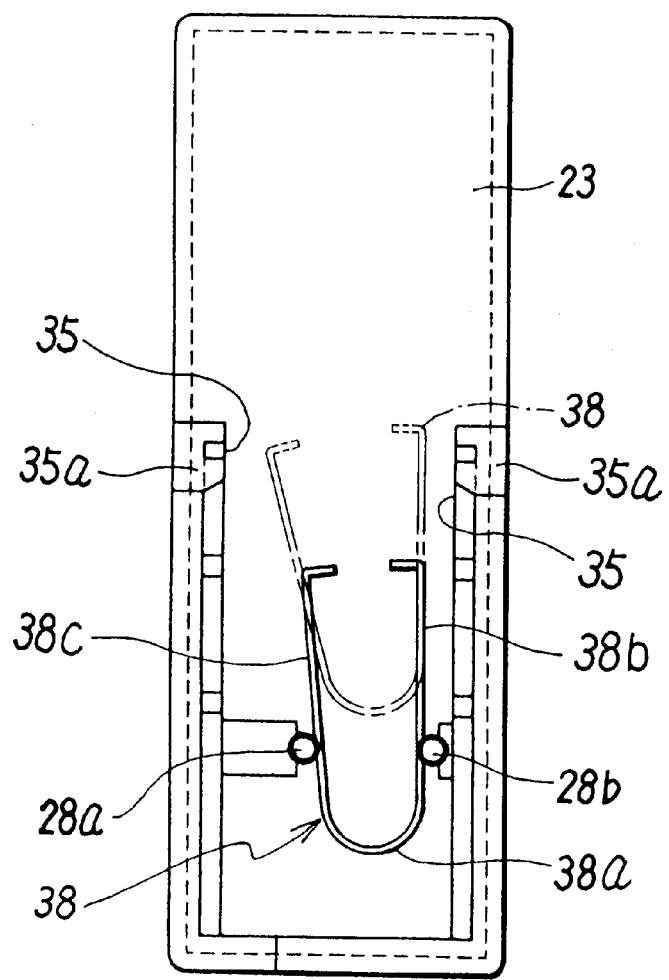
FIG. 8 is a left-side view of the solenoid valve in FIG. 2 with the operation member removed.

In the solenoid valve 1A of the above configuration, when the operation member 34 of the electric switch 33 is pressed downward to the ON position, as shown in each solenoid valve in FIG. 1, the bent portion 38a of the conducting plate 38 is fitted between the first and the second pins 28a and 28b, and the sides 38b and 38c elastically contact the two pins 28a and 28b, as shown by the solid line in FIG. 8. Electricity is thus conducted through these pins to cause the solenoid valve 1A to connect to the controller, that is, the power supply. The controller then switches the state of the solenoid valve 1A.

In addition, when the operation member 34 is pressed downward to the OFF position, as shown by the chain line in the solenoid valve in FIG. 1, the conducting plate 38 is separated from the first and the second pins 28a and 28b to stop electricity from being conducted through the pins 28a and 28b. The solenoids 13a and 13b are thus disconnected from the controller, and the solenoid valve 1A can be manually switched using the manual operation means 15a and 15b.

When the operation member 34 is moved upward into the OFF position, a protrusion 36a at the lower end of the protruding branch 36 engages a protrusion 35a on the guide wall 23a and stays in that position.

The solenoid valve 1A can be simply and reliably turned on and off by operating the electric switch 33 directly mounted on the solenoid valve 1A.

This eliminates the need to go to the controller to disconnect the device, and allows the solenoid valve to be disconnected from the power supply at the solenoid valve installation site. Thus, such disconnection and subsequent servicing such as operation checks using the manual operation means can be simply and efficiently performed through a series of operations.

Even if various solenoid valves are combined to form a set of connected solenoid valves so that the feeding box 4 can feed electricity to all the solenoid valves simultaneously, as shown in FIG. 1, the electric switches 33 mounted on the solenoid valves to be serviced can be operated so as to reliably disconnect only those solenoid valves, thereby preventing the other solenoid valve switches from being inadvertently operated. Furthermore, since the electric switch is disposed at the axial end of the solenoid valve, there is no interference with the operation of the switch even if various solenoid valves are connected together along the width. The addition of solenoid valves is easy compared to the use of a separate switching unit that includes all the electric switches.

Since the conducting plate 38 bent like the character "U" is moved in and out between the two pins 28a and 28b to elastically contact and leave the pins, the electric switch 33 has a simple structure, allows easy switching operations, and operates reliably due to the absence of bad contacts. Furthermore, because the switch is easily mounted in a limited space, it is best mounted in a member such as a solenoid valve, which tends to have a limited space and size.

In the illustrated embodiment, the solenoid valve is of a double-solenoid pilot 5 port type, but is not limited to this type. It may also be a three or four port type. Alternatively, it may be of a single solenoid type. Alternatively, it may be a direct-acting solenoid valve that allows the electromagnetic operation section to directly drive the valve member.

In addition, the illustrated solenoid valve is mounted on the manifold base and compressed air is supplied and discharged via the manifold base, but supply and discharge channels that penetrate various directly connected solenoid valves in the connecting direction may be formed in the solenoid valves.

Of course, various solenoid valves may not only be connected together to form a set of connected solenoid valves, but a single solenoid valve may also be used.

Figure 9:
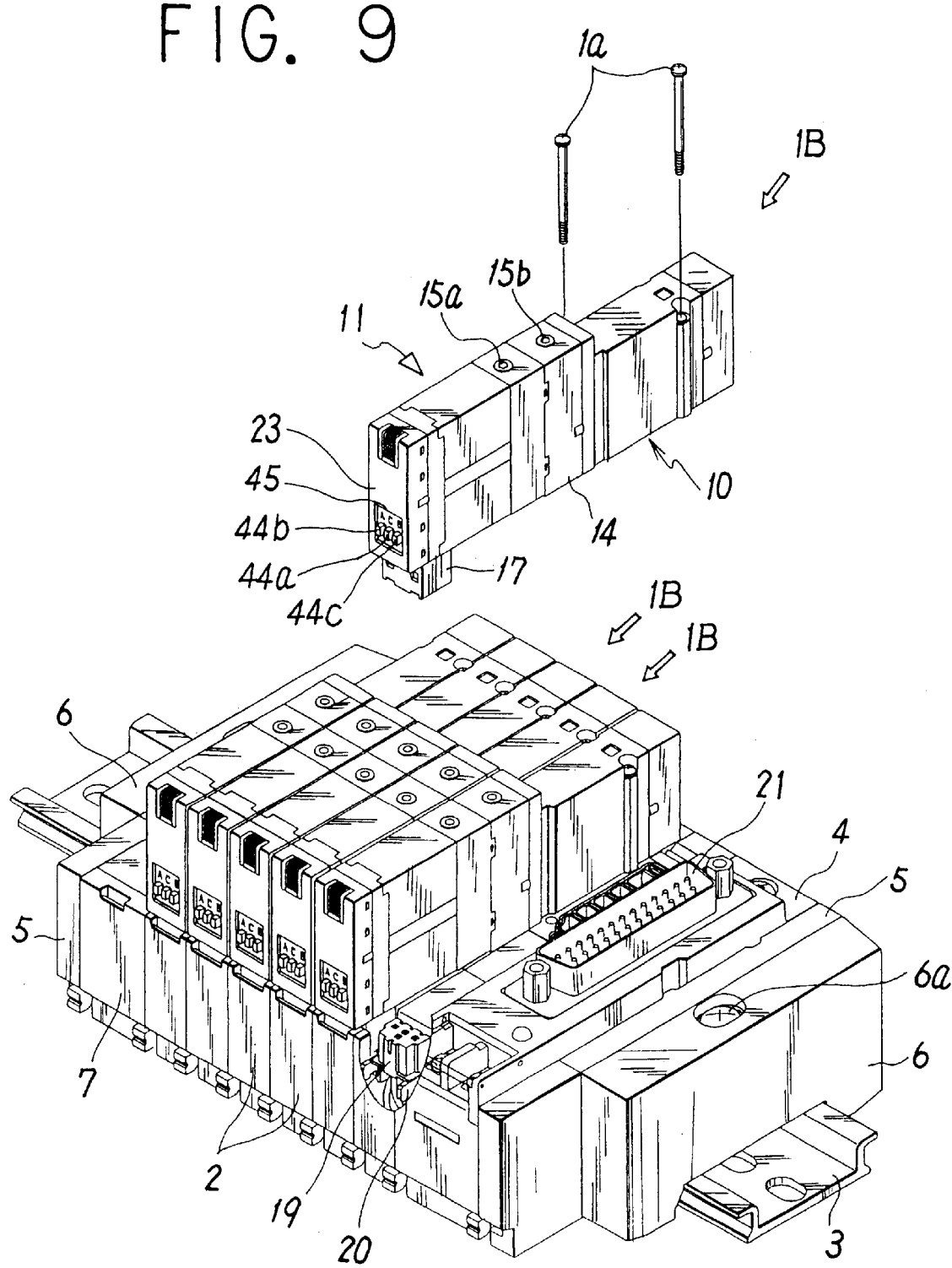
FIG. 9 is a perspective view showing a set of connected solenoidvalves comprising solenoid valves according to the second embodiment of this invention, with one valve disconnected from the set.
Figure 10:
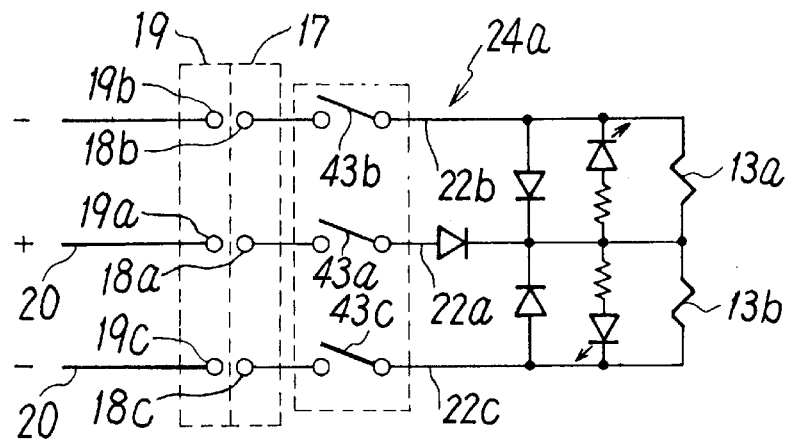
FIG. 10 shows a feeding circuit in the solenoid valve in FIG. 9.

FIGS. 9 and 10 show a second embodiment according to this invention. According to the second embodiment, a solenoid valve 1B has individual electric switches 43a, 43b, 43c that open and close the three leads 22a, 22b, 22c connecting the three receiving terminals 18a, 18b, 18c in the feeding circuit 24a to the solenoids 13a, 13b, while three operation members 44a, 44b, 44c corresponding to the switches are disposed within a recess 45 in the cover 23. The operation members 34a, 34b, 34c are formed at a height at which they do not protrude outwardly from the outer surface of the cover 23, thus the inner wall of the recess 45 constitutes a guard wall that protects the operation members.

The second embodiment is almost the same as the first embodiment except that the solenoid valve has three switches. Therefore, the same main components have the same reference numerals and their description is omitted.

The configuration of the switches 43*a*, 43*b*, 43*c* according to the second embodiment may be the same as or different from the switch 33 according to the first embodiment.

Figure 11:
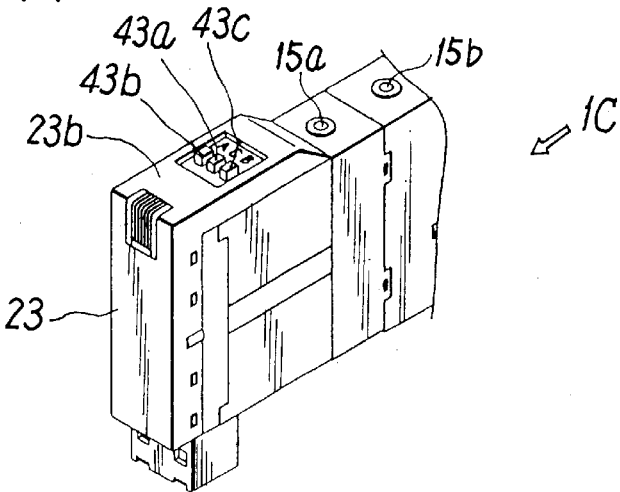
FIG. 11 is a perspective view showing the integral part of a solenoid valve according to the third embodiment of this invention.

FIG. 11 shows a third embodiment of this invention. In a solenoid valve 1C according to the third embodiment, the cover has an extension 23*b* covering the top surface of the electromagnetic operation section 11, and the electric switches 43*a*, 43*b*, 43*c* are provided within the recess 45 on the extension 23*b*, which is located on the top surface of the solenoid valve 1C. The other configuration is almost the same as in the second embodiment.

In the second and the third embodiments, only the two leads 22*b*, 22*c* leading to the receiving terminals 18*b*, 18*c* of the negative pole may be provided with the switches (43*b* and 43*c*) by omitting the switch 43*a* in the common lead 22*a* leading to the receiving terminal 18*a* of the positive pole. In this case, the two operation members 44*b*, 44*c* are provided in the solenoid valve.

In addition, instead of various operation members within the recess 45, only one operation member may be provided so as to simultaneously open and close two or three switches.

Figure 12:
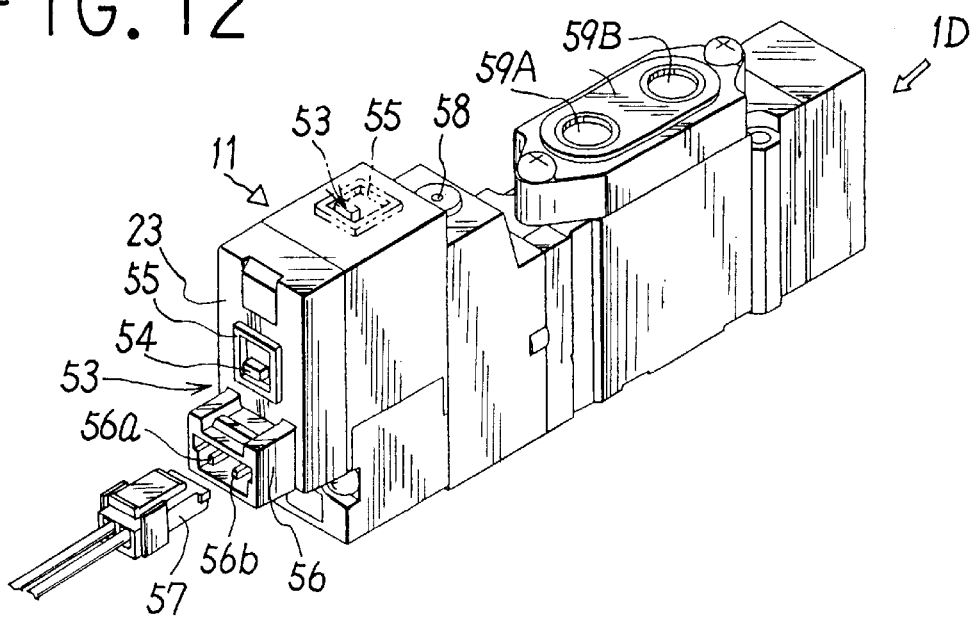
FIG. 12 is a perspective view showing a solenoid valve according to the fourth embodiment of this invention.
Figure 13:
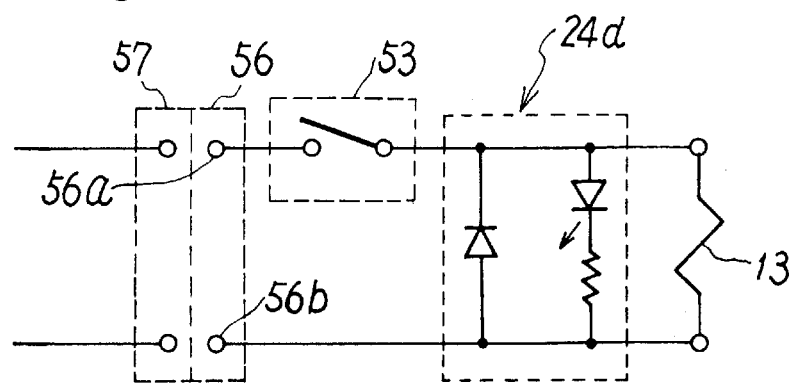
FIG. 13 shows a feeding circuit in the solenoid valve in FIG. 12.

FIGS. 12 and 13 show a solenoid valve 1D and a feeding circuit 24*d* according to the fourth embodiment, and the solenoid valve 1D is of a single solenoid type with one pilot valve (thus, the solenoid 13). In the solenoid valve 1D, an operation member 54 for an electric switch 53 is provided on the outer surface of the cover 23 of the electromagnetic operation section 11 and a frame-like guard wall 55 is installed so as to surround the operation member 54.

In the figures, 56*a*, 56*b* are receiving terminals, 57 is a feeding terminal, 58 is a manual operation means, and 59A, 59B are output ports.

The electric switch 53 may be provided on the axial end surface of the solenoid valve as shown by the solid line in FIG. 12 or on the top surface shown by the chain line.

Figure 14:
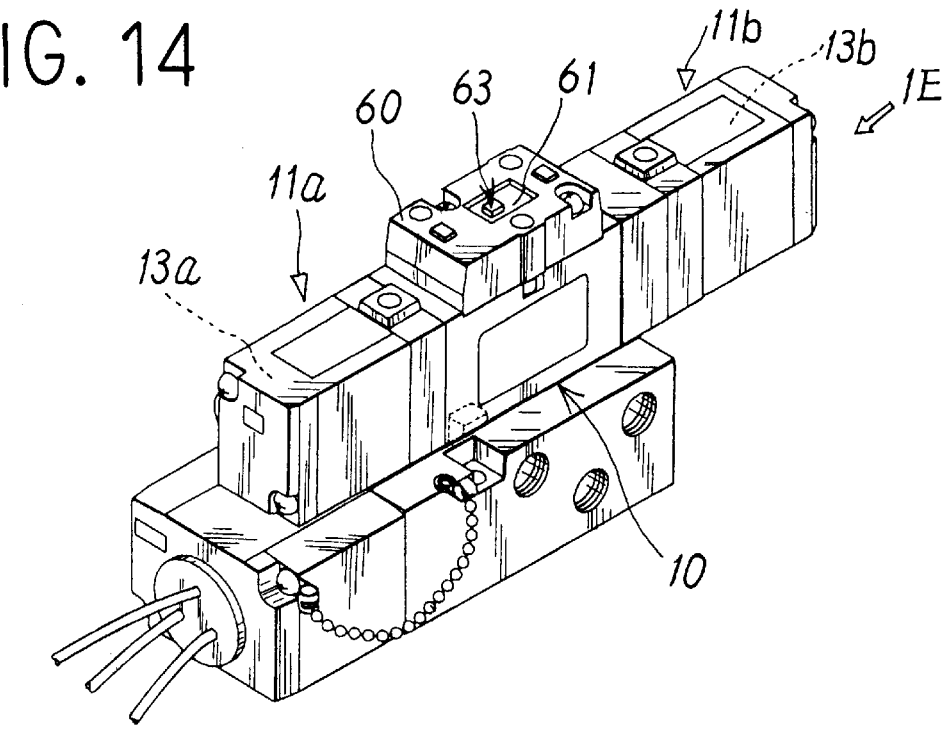
FIG. 14 is a perspective view showing a solenoid valve according to the fifth embodiment of this invention.
Figure 15:
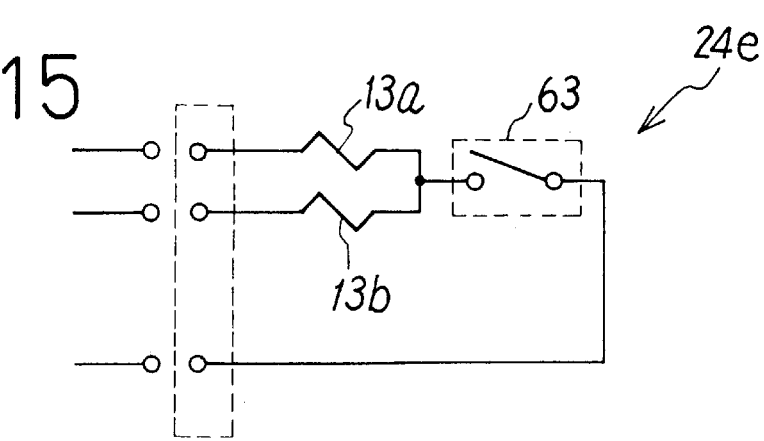
FIG. 15 shows a feeding circuit in the solenoid valve in FIG. 14.

FIGS. 14 and 15 shows the fifth embodiment of this invention, and a solenoid valve 1E according to the fifth embodiment is of a double solenoid type that includes on both sides of the main valve section 10 the electromagnetic operation sections 11*a* and 11*b* with the solenoid valves 13*a* and 13*b*. In the solenoid valve 1E, a printed substrate with a feeding circuit 24*e* assembled thereon and a cover 60 covering the printed circuit are disposed on the top surface of the main valve section 10, with an electric switch 63 mounted within a recess 61 formed on the top surface of the cover 60.

What is claimed is:

1. A solenoid valve configured to be mounted on a manifold, in which a main valve section including a valve member for diverting the flow of a pressurized fluid and an electromagnetic operation section for switching said valve member by activating the solenoid are mutually and contiguously united wherein:

an electric switch that allows said solenoid to be manually switched on and off is disposed at at least one of said main valve section and said electromagnetic operation section.

2. The solenoid valve according to claim 1 wherein said switch is protected by a guard wall of at least the same height as the electric switch.

3. A solenoid valve in which a main valve section including a valve member for diverting the flow of a pressurized fluid and an electromagnetic operation section for switching said valve member by activating the solenoid are mutually and contiguously united, wherein:

an electric switch that allows said solenoid to be manually switched on and off is disposed at at least one of said main valve section and said electromagnetic operation section, and wherein said electric switch comprises an operation member installed on the outer surface of the solenoid valve for switching operations, a first pin leading to an external power supply and a second pin leading to said solenoid, said first and second pins constituting a pair of electric contacts horizontally arranged at an interval and an approximately U-shaped conducting member of an elastic conductive material, disposed between said first and second pins, and displaced by the operation of said operation means so as to contact and leave said first and second pins.

4. The solenoid valve according to claim 3 wherein said electromagnetic operation section has a printed substrate with a feeding circuit assembled thereon and a detachable cover covering the printed circuit, wherein said first and second pins are disposed so as to penetrate the cover and operation member disposed on its outer surface and including said conducting member.

5. The solenoid valve according to claim 4 wherein said cover includes said guard wall to protect the operation member.

6. The solenoid valve according to claim 5 wherein said guard wall comprises a right guard wall and a left guard wall, and a guide groove is formed in an inner surface of said right guide wall and in an inner surface of said left guide wall, while a protruding branch is formed on each of a right and a left outer surface of said operation member so that the guide grooves and the protruding branches form a guide mechanism to guide the movement of the operation member.

7. The solenoid valve according to any of claims 1, 2, 4, 5 or 6 wherein the solenoid valve has a manual operation means that allows said valve member to be manually switched.

8. The solenoid valve according to claim 3 wherein the solenoid valve has a manual operation means that allows said valve member to be manually switched.

9. A solenoid valve in which a main valve section including a valve member for diverting the flow of a pressurized fluid and an electromagnetic operation section for switching said valve member by activating the solenoid are contiguously and mutually united, in the electromagnetic operation section a feeding circuit is installed on a part of the valve body, having semi-conductor element to prevent counter electromotive forces and another semi-conductor element for light-emitting that indicates the conductive state wherein:

an electric switch is directly disposed at at least one of said main valve section and said electromagnetic operation section that allows external operations, allowing said solenoid and feeding circuit to be manually switched on and off, being able to keep itself at the position switched on or off.

10. The solenoid valve according to claim 9 wherein said switch is protected by a guard wall of at least the same height as the electric switch.

11. The solenoid valve according to claim 9 wherein said electric switch comprises:

an operation member installed on the outer surface of the solenoid valve for switching operations, a first pin leading to an external power supply and a second pin leading to said solenoid, said first and second pins constituting a pair of electric contacts horizontally arranged at an interval and an approximately U-shaped conducting member of an elastic conductive material, disposed between said first and second pins, and displaced by the operation of said operation means so as to contact and leave said first and second pins.

12. The solenoid valve according to claim 11 wherein said electromagnetic operation section has a printed substrate with a feeding circuit assembled thereon and a detachable cover covering the printed circuit, wherein said first and second pins are disposed so as to penetrate the cover and operation member disposed on its outer surface and including said conducting member.

13. The solenoid valve according to claim 12 wherein said cover includes said guard wall to protect the operation member.

14. The solenoid valve according to claim 13 wherein said guard wall comprises a right guard wall and a left guard wall, and a guide groove is formed in an inner surface of said right guide wall and in an inner surface of said left guide wall, while a protruding branch is formed on each of a right and a left outer surface of said operation member so that the guide grooves and the protruding branches form a guide mechanism to guide the movement of the operation member.

15. The solenoid valve according to any of claims 9, 10, 12, 13 or 14 wherein the solenoid valve has a manual operation means that allows said valve member to be manually switched.

16. The solenoid valve according to claim 11 wherein the solenoid valve has a manual operation means that allows said valve member to be manually switched.

* * * * *